(12) United States Patent
Bühring

(10) Patent No.: US 6,542,947 B1
(45) Date of Patent: Apr. 1, 2003

(54) DATA BUS FOR SERIAL DATA TRANSMISSION

(75) Inventor: Peter Bühring, Hamburg (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/406,283

(22) Filed: Sep. 24, 1999

(30) Foreign Application Priority Data

Sep. 24, 1998 (DE) .......................................... 198 43 810

(51) Int. Cl.⁷ ................................................ G06F 1/00
(52) U.S. Cl. ........................ 710/107; 710/105; 710/244
(58) Field of Search .............................. 710/107, 104, 710/105–106, 110, 116, 111, 123, 244, 305, 306, 311, 313, 62, 63, 64, 72; 709/208, 209, 217, 220, 223, 225; 370/445, 447, 449–450, 461

(56) References Cited

U.S. PATENT DOCUMENTS

| | | | | |
|---|---|---|---|---|
| 5,323,385 A | * | 6/1994 | Jurewicz et al. | ............... 370/43 |
| 5,524,213 A | * | 6/1996 | Dais et al. | ................... 709/207 |
| 5,600,782 A | * | 2/1997 | Thomson | ........................ 714/4 |
| 5,760,489 A | * | 6/1998 | Davis et al. | ................ 307/10.1 |
| 5,764,919 A | * | 6/1998 | Hashimoto | ................... 709/236 |
| 5,928,344 A | * | 7/1999 | Stierli | ......................... 710/105 |
| 6,111,888 A | * | 8/2000 | Green et al. | ................. 370/461 |
| 6,385,210 B1 | * | 5/2002 | Overberg et al. | ........... 370/447 |

* cited by examiner

*Primary Examiner*—Gopal C. Ray
*Assistant Examiner*—Raymond N Phan
(74) *Attorney, Agent, or Firm*—Steven R. Biren

(57) ABSTRACT

A data bus for serial bus transmission between apparatus which are capable of transmitting and/or receiving data via the data bus, recessive and dominant states being present on the data bus and each state being assigned a respective bit value. In order to interrupt a message of low priority by a message of higher priority without incurring a time delay and without additional channels being required, messages are transmitted in message blocks, each message block having at its beginning a start block with (n+k) dominant and j subsequent recessive bits and subsequent data blocks with n data bits and m subsequent recessive bits. A message block of low priority currently being transmitted can be interrupted by another apparatus in order to transmit a message block of higher priority in that the other apparatus generates a new start block on the data bus and subsequently transmits the associated data blocks. An apparatus transmitting a message block via the data bus continuously checks whether a start block appears on the data bus and, if necessary, interrupts the transmission of its message block.

14 Claims, 2 Drawing Sheets

FIG.2A

$t_1$ $t_2$ rddddddrdrddrdddrrrddrrdrdrr

| SOF | DB | DB | DB | DB |

FIG.2B

FIG.2C dddrrrddrddrrr

| SOF$_v$ | DB | DB |

FIG.2D

FIG.2E rddddddrdrddrdddr

| SDF | DB | DB$_v$ |

FIG.2F rddddddrdrddrddddrrrddrddrrr

| SOF | DB | SOF | DB | DB |

$t \longrightarrow$

DATA BUS FOR SERIAL DATA TRANSMISSION

BACKGROUND OF THE INVENTION

The invention relates to a data bus for serial data transmission between apparatus which are capable of transmitting and/or receiving data via the data bus, recessive and dominant states being present on the data bus and a respective bit value being associated with each of said states.

For data buses of this kind it is nowadays desirable to interrupt a message currently being transmitted when a message of higher priority is to be transmitted. In most cases this is possible only subject to given conditions, because either a very intricate mechanism is provided so as to privilege urgent messages or an urgent message cannot really be transmitted immediately, or additional transmission channels are provided in order to signal an urgent message.

For example, according to U.S. Pat. No. 5,546,392 an additional transmission channel is provided so as to signal an urgent message.

SUMMARY OF THE INVENTION

It is an object of the invention to provide a serial data bus in which a message of low priority in a channel can be interrupted at any time and immediately by a message of higher priority, so that, if desired, the message of higher priority can be transmitted on the data bus without delay.

This object is achieved according to the invention in that messages are transmitted in message blocks, each message block having at its beginning a start block with (n+k) dominant bits and j subsequent recessive bits and subsequent data blocks with n data bits and m subsequent recessive bits, that a message block of low priority currently being transmitted can be interrupted by another apparatus in order to transmit a message block of higher priority in that said other apparatus generates a new start block on the data bus and subsequently transmits the associated data blocks, and that an apparatus transmitting a message block on the data bus continuously checks whether a start block appears on the data bus and interrupts the transmission of its message block, if necessary.

Two states exist on the serial data bus: the recessive state and the dominant state. Different bit values are assigned to the two states; for example, the bit value zero is assigned to the dominant state and the bit value one to the recessive state. The bus may then be configured, for example, in such a manner that a transmitting source realizes the dominant state in that it reduces the amplitude of the bus to zero or substantially zero. The recessive state can be realized by way of high impedance behavior of the source, since the bus then automatically assumes a high level. The bus also assumes the recessive state in the absence of message transmission.

For the data bus according to the invention the form in which messages are transmitted is defined. Transmission takes place in the form of message blocks, each message block having a start block at its beginning and subsequently at least one data block. Given formats are defined for the start blocks as well as for the data blocks. For example, for each start block at the beginning of a message block it is defined that it should include n+k dominant bits and j subsequent recessive bits. Data blocks, however, contain at the most n data bits which are succeeded by m subsequent recessive bits. From this definition it already follows that a start block must be concerned when more than n dominant bits appear on the bus, because data blocks contain at the most n data bits and hence, even when the n data bits are all dominant, no more than n dominant bits can appear in succession in a data block, because each data block is always succeeded by m subsequent recessive bits. Unambiguous identification of the start blocks is thus obtained already. For the data bus according to the invention there are also defined message blocks of different priority. At least two priorities are provided, said priorities being configured so that a message block of lower priority which is being transmitted can be interrupted at any time and immediately by a message block of higher priority. This is realized in that the sender of the message block of higher priority generates a start block of the message block of higher priority on the data bus. This also takes place during the transmission of the message block of lower priority. The sender of the message block of higher priority realizes the foregoing by generating n+k dominant bits on the data bus as the start block. For this purpose use may also be made, if desired, of dominant bits of the transmitted message block of lower priority. However, recessive bits of the message block of lower priority may also be overwritten by dominant bits. It is only important that the sender of the message block of higher priority generates n+k dominant bits with j subsequent recessive bits on the data bus.

The transmission of the message of higher priority can be successful only if the sender of the message of lower priority interrupts the transmission of the relevant message block upon recognition of a start block on the data bus. Therefore, for the data bus according to the invention it is also necessary that a sender of a message continuously monitors the data bus for the appearance of a start block from another sender on the data bus. In that case the sender must interrupt his message. Similarly, a receiver continuously checks whether a new start block appears. If this is the case before the reception of the previous message has been duly completed, the reception is interrupted and the reception of a new message commences after the start block.

It is thus achieved that a message block of higher priority can interrupt the transmission of a message block of lower priority at any time by generating a start block of the message of higher priority on the bus.

No additional channels or signaling are required for the coordination of the message blocks of the various priorities on the bus. A current message of lower priority can indeed be extremely simply interrupted by a message of higher priority on the data bus according to the invention. It is also ensured that the urgent message can indeed be transmitted immediately and that it is not necessary to wait a given period of time so as to complete a message already present on the bus or to execute a decision process. Because of the simplicity of the procedure, the data bus according to the invention can be extremely simply implemented. by the defined apparatus.

Moreover, as in a further embodiment of the invention it may also be advantageously predetermined which message, and hence also which message block, is allowed to interrupt other currently transmitted message blocks.

As is realized in a further embodiment of the invention, in the simplest case a currently transmitted message block may already be interrupted when the $(n+1)^{th}$ bit of a data block on the data bus is dominant. In that case it can already be expected that another sender generates a start block on the bus, even though the n+k necessary dominant bits are not yet present on the bus. In this manner the fastest possible interruption of the transmission of the data block of lower priority can be realized.

However, if it must be reliably ensured that a start block is indeed concerned, it may be advantageous, as in a further embodiment of the invention, that the transmitting apparatus interrupts the transmission of its message block only if a defined number of bits between the n+1$^{th}$ and the (n+k)$^{th}$ bit on the bus is dominant. Depending on the selected predetermined number, a high degree of reliability can be achieved that not a data error is concerned but a start block from another transmitting apparatus.

In the simplest case, as in a further embodiment of the invention, a transmitting apparatus can already interrupt its message block when a bit by bit check reveals that a bit transmitted as being recessive is actually dominant on the data bus. In that case either the start block of another transmitting apparatus or a data error is concerned.

When an apparatus wishes to transmit a message of higher priority on the data bus and hence interrupt a message block of lower priority being transmitted on the data bus, a start block with n+k dominant bits must be generated. To this end, during a phase in which the recessive bits are generated in the second message, the transmitting apparatus can replace these bits by n+k dominant bits. However, as in a further embodiment of the invention, the apparatus can also involve dominant bits of the message block of lower priority being transmitted in the generation of the dominant bits of its start block. It can thus also utilize dominant bits of the message block of lower priority in order to generate the dominant bits of its start block. This enables even faster interruption and hence also faster transmission of the message block of higher priority.

In order to minimize the time losses, notably for the start block, and also the time required for the recessive bits at the end of the blocks, in a further embodiment of the invention the number of recessive bits in the start blocks and the data blocks each time amounts to only one and the number of dominant bits of a start block is one bit larger than the number of data bits in the data blocks. The procedure for the data bus according to the invention can thus be executed already and only a minimum additional amount of time is required for the recognition of the start blocks.

The simplest case may involve only messages of two priorities as in a further embodiment of the invention. This makes it very simply clear which message may interrupt other messages.

The steps described in claim 11 may be advantageously used to signal the priority of a transmitted message.

BRIEF DESCRIPTION OF THE DRAWINGS

An embodiment of the invention will be described in detail hereinafter with reference to the drawing. Therein:

FIG. 2 is a diagrammatic representation of the interruption of the transmission of a message block of lower priority by a message block of higher priority.

DETAILED DESCRIPTION OF THE PREFERRED EMBODIMENTS

Figure 1:
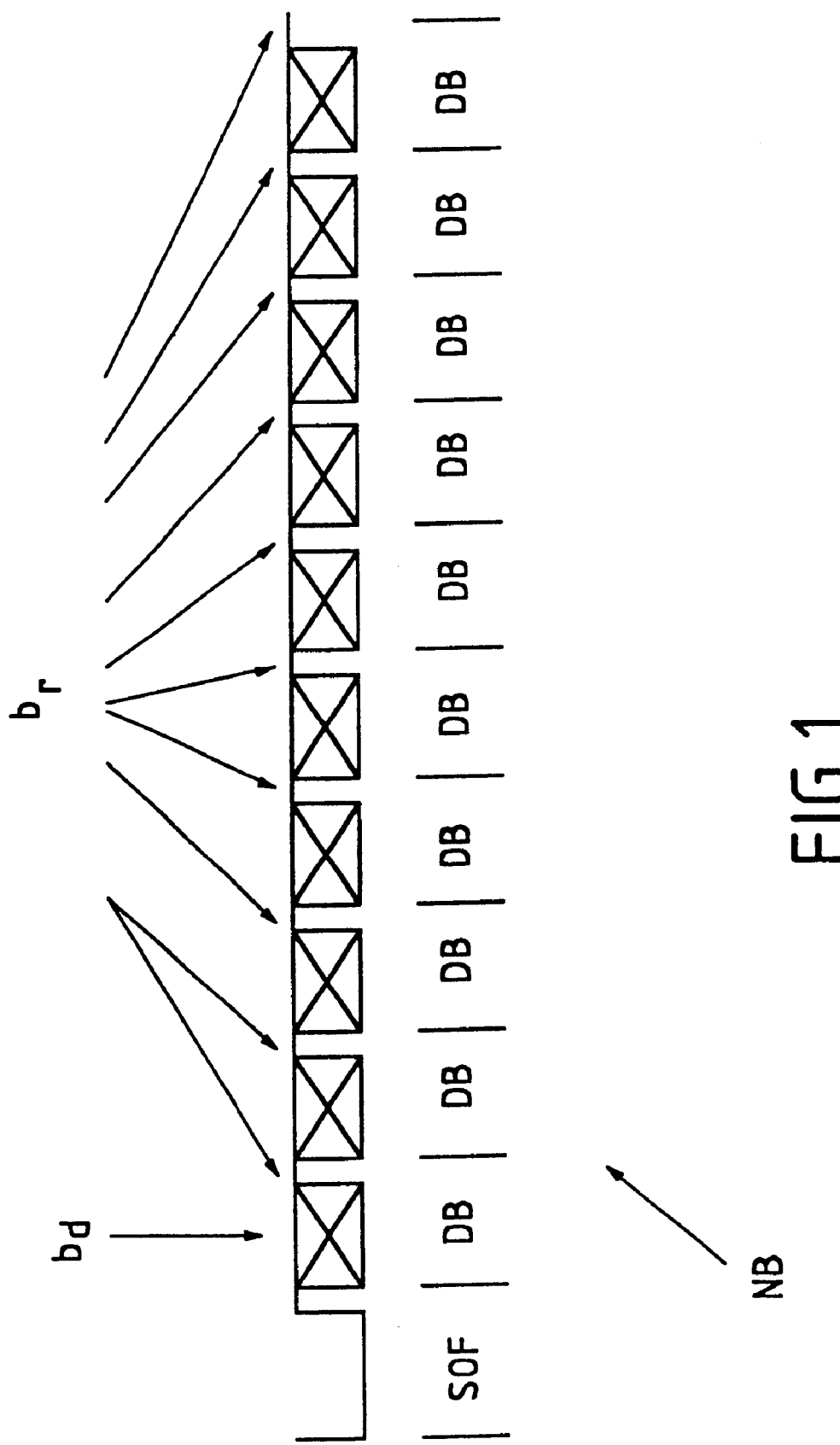
FIG. 1 is a diagrammatic representation of the structure of a message block on the data bus according to the invention.

FIG. 1 shows diagrammatically a message block NB as it could be transmitted via the data bus according to the invention.

It is diagrammatically indicated that two states may exist on the bus. On the one hand, there is the dominant state d, meaning a low level in the present embodiment. There is also a recessive state r which signifies a high level on the bus in the present example. For example, it may be defined that the bit value 0 is assigned to the dominant state and the bit value 1 to the recessive state of the bus.

A start block SOF is transmitted at the beginning of each message block NB. It is defined that n+k dominant bits are transmitted in each start block at the beginning. In the Figure this is represented by a corresponding low amplitude at the level d of the dominant bits. It is also defined that the n+k dominant bits in the start block are succeeded by j recessive bits. This can be recognized in FIG. 1 in that the data bus assumes the high level at the end of the start block SOF, so that at least one recessive bit is transmitted.

A predetermined number of data blocks DB is transmitted within the message block; in the embodiment of FIG. 1 ten data blocks are concerned.

In each data block DB first n data bits are transmitted. The n data bits in each data block are succeeded by m recessive bits. In the Figure these bits are indicated each time behind the data bits and are symbolized by the letters $b_r$.

The data bits $b_d$ of each data block DB in the Figure can be either recessive or dominant, depending on the contents of the message to be transmitted.

In the simplest case for the number j of recessive bits in the start block and the number m of recessive bits in the data blocks it may be defined that they amount to only one bit each time, so that j=1 and m=1. It may also be defined that the number n+k of dominant bits in the start block is only one bit larger than the number n of data bits in the data blocks, so that k=1. A minimum length of the start block is thus achieved and hence also a minimum transmission time for the start blocks.

For the further description of the embodiment it is assumed that four data bits are transmitted in each data block, i.e. that n=4, and that the start block is only one bit longer, so that k=1. Furthermore, it is assumed that the number of recessive bits amounts to only 1, so that j=1 and m=1.

This assumption holds notably for the description of the procedure for interrupting a currently transmitted message block by a message block of higher priority in conformity with FIG. 2.

In FIG. 2 the letter d denotes the transmission of a dominant bit and r denotes the transmission of a recessive bit on the data bus. Bits d or r in heavy print belong either to a start block SOF or constitute a recessive bit of a data block DB.

FIG. 2A shows first of all a possible transmission of a message block of lower priority on the data bus. The message block has a start block SOF at its beginning; first five dominant bits d and one subsequently transmitted recessive bit r appear in said start block. In the representation given in FIG. 2A the start block SOF is followed by four data blocks DB in which each time first four data bits d or r are transmitted and subsequently each time one recessive bit r.

For example, at the instant $t_1$, (indicated by a bar in FIG. 2B), it may become desirable to interrupt the message transmitted in conformity with FIG. 2A. Instead a message block of higher priority is to be transmitted.

The transmission of a new message block of higher priority necessitates the transmission of a new start block SOF at the beginning of the new message.

To this end, it is necessary that five dominant bits d are generated on the data bus. This can take place, for example in a transmission gap or by replacement of five recessive bits on the data bus by dominant bits. These alternatives, however, often are not available when a message is continuously transmitted via the data bus, for example the message of FIG. 2A. In this case it is simpler, and notably faster, to utilize also the dominant bits d present on the data bus in order to generate the starting block SOF of the message block of higher priority. To this end, in the example shown in FIG. 2 the first two dominant bits of the second data block of the message of FIG. 2A are utilized in order to generate the start block. FIG. 2C shows that the transmitting apparatus, wishing to transmit the message block of higher priority via the data bus, itself generates only a shortened start block $SOF_v$ which itself contains only three dominant bits d.

This number has been chosen because at the instant $t_1$, at which the wish for the transmission of the message of higher priority became apparent, two dominant data bits were already present in the second data block of the message of FIG. 2A on the bus. Therefore, the sender of the message block of higher priority need generate only three further data bits d on the bus after the instant $t_1$.

After a new start block has been generated in this manner, the data blocks DB of the message of higher priority can subsequently be transmitted via the data bus as indicated in FIG. 2C.

FIG. 2F shows the result of the interruption of the message block of FIG. 2A by the message block of higher priority of FIG. 2C. FIG. 2F first shows the start block SOF of the message of lower priority and subsequently a data block DB of the message block of lower priority in conformity with FIG. 2A. The two dominant bits d, originally transmitted in the message of FIG. 2A, have now also been used for the start block SOF of the subsequently transmitted message of higher priority. In the start block SOF the two bits of the second message block DB of the message of FIG. 2A and the three bits actually transmitted by the sender in conformity with FIG. 2C have been combined so as to form a new start block SOF which contains five dominant bits d which are succeeded by a recessive bit r. Subsequently, the data blocks DB of the message of higher priority as shown in FIG. 2C appear on the data bus in conformity with FIG. 2F.

The message of higher priority of FIG. 2C has thus indeed been started immediately. It has even been possible to utilize dominant bits d of the message of FIG. 2A, transmitted already prior to the desired starting instant $t_1$, for the start block of the message block of higher priority.

An essential condition to be satisfied in order to achieve such fast transmission of the message block of higher priority according to FIG. 2C consists in that the sender of the message block of lower priority according to FIG. 2A interrupts the transmission of this message block immediately when the more urgent message of FIG. 2C is to be transmitted.

To this end, various conventions can be agreed upon. The transmission can be interrupted when a start block of another apparatus appears on the bus. The transmission, however, can also be interrupted already when a bit which was transmitted as a recessive bit r actually appears as a dominant bit on the data bus. This case was selected for the representation of FIG. 2. FIG. 2D indicates that at the instant $t_2$ the sender of the message shown in FIG. 2A recognizes that the recessive bit r of the second data block of the message block on the data bus, transmitted directly before the instant $t_2$, actually appears as a dominant bit as shown in FIG. 2F. This is so because the sender of the message of higher priority as shown in FIG. 2C has generated the shortened start block with three dominant bits and hence the last bit before the instant $t_2$ appears as a dominant bit on the data bus.

Because the sender of the message shown in FIG. 2A continuously monitors the bits on the data bus, at the instant $t_2$ the sender recognizes that the last bit transmitted as a recessive bit by this sender actually appears as a dominant bit on the data bus. Therefore, the sender interrupts the transmission of this message as shown in FIG. 2E. The last bit transmitted by the sender as a recessive bit and actually appearing on the data bus as a dominant bit is the last transmitted bit, because it was detected at the instant $t_2$ and the transmission of the message was interrupted in conformity with FIG. 2E. The last data block transmitted is a reduced data block $DB_v$ which will not be further transmitted thereafter.

Thus, a message of lower priority on the data bus according to the invention can be interrupted at any instant by a message of higher priority, without additional transmission capacity being required and without the interruption being delayed by a coordination procedure.

What is claimed is:

1. A data bus for serial bus transmission between apparatus which are capable of transmitting and/or receiving data via the data bus, recessive and dominant states being present on the data bus and a respective bit value being associated with each of said states, characterized in that messages are transmitted in message blocks, each message block having at its beginning a start block with (n+k) dominant bits and j subsequent recessive bits and subsequent data blocks with n data bits and m subsequent recessive bits, wherein n, k, j and m are integers greater than zero, and wherein a message block of low priority currently being transmitted can be interrupted by another apparatus in order to transmit a message block of higher priority in that said other apparatus generates a new start block on the data bus and subsequently transmits the associated data blocks, and that an apparatus transmitting a message block on the data bus continuously checks whether a start block appears on the data bus and interrupts the transmission of its data block, if necessary.

2. A data bus as claimed in claim 1, wherein only a defined apparatus is authorized to interrupt other message blocks.

3. A data bus as claimed in claim 1, wherein the type of message with which an apparatus may interrupt other message blocks is defined.

4. A data bus as claimed in claim 1, wherein a transmitting apparatus interrupts the transmission of a message block if the $(n+1)^{th}$ bit of a data block on the data bus is not recessive.

5. A data bus as claimed in claim 1, wherein a transmitting apparatus interrupts the transmission of a message block when a predetermined number of bits from the $(n+1)^{th}$ up to including the $(n+k)^{th}$ bit of a data block on the data bus is/are not recessive.

6. A data bus as claimed in claim 1, wherein a transmitting apparatus bit by bit checks an own message block on the bus during the transmission and interrupts this message block when a bit which is transmitted as a recessive bit actually appears as a dominant bit on the data bus.

7. A data bus as claimed in claim 1, wherein in order to generate a start block of a message block which interrupts another message block an apparatus possibly utilizes dominant bits present on the data bus.

8. A data bus as claimed in claim 1, wherein a receiver continuously checks whether a new start block of a new second message block appears during a transmitted first message block, and that the receiver possibly interrupts the reception of the transmitted first message block and commences the reception of the second, new message block.

9. A data bus as claimed in claim 1, wherein n=4, m=1, k=1 and j=1.

10. A data bus as claimed in claim 1, wherein there are two priority levels for the message blocks.

11. A data bus as claimed in claim 1, wherein a data error is recognized if no recessive bit appears on the data bus after n data bits and no start block is identified.

12. A data bus as claimed in claim 1, wherein after a start block, transmission of a predetermined number of recessive or dominant bits takes place, in dependence on the priority of the message block to be transmitted.

13. A data bus as claimed in 1, wherein said data bus is configured for use in vehicles in order to exchange messages between control apparatus, notably for the immediate transmission of a message block which interrupts other message blocks and ignites an airbag of the vehicle.

14. A data bus for serial data transmission between apparatus which are capable of transmitting and receiving data via the data bus, comprising:

recessive and dominant states on the data bus, wherein each of the states have a respective bit value associated therewith;

wherein messages are transmitted in message blocks, wherein each message block commences with a start block that includes (n+k) dominant bits and j subsequent recessive bits and that is followed by a data block that includes n data bits and m recessive bits, and wherein n, k, j and m are integers greater than zero;

wherein a message block of low priority currently being transmitted can be interrupted by another apparatus in order to transmit a message block of higher priority, wherein the other apparatus generates a new start block on the data bus and subsequently transmits the associated data blocks, wherein an apparatus transmitting a message block on the data bus continuously checks whether a start block appears on the data bus and interrupts the transmission of its data block, if necessary, and wherein a receiver continuously checks whether a new start block of a new second message appears during a transmitted first message block, and that the receiver possible interrupts the reception of the transmitted first message block and commences reception of the second, new message block.

* * * * *